United States Patent
Seong et al.

(10) Patent No.: US 7,501,779 B2
(45) Date of Patent: Mar. 10, 2009

(54) TURRET SERVO CONTROL DEVICE WITH OVERRIDING AND CONTROL METHOD THEREOF

(75) Inventors: Dae Jung Seong, Gyeongsangnam-do (KR); Nak Won Choi, Gyeongsangnam-do (KR); Hong Cheol Sin, Gyeonggi-do (KR); Myoung Soo Oh, Gyeongsangnam-do (KR)

(73) Assignee: Doosan Infracore Co., Ltd., Incheon (KR)

( * ) Notice: Subject to any disclaimer, the term of this patent is extended or adjusted under 35 U.S.C. 154(b) by 253 days.

(21) Appl. No.: 11/616,186

(22) Filed: Dec. 26, 2006

(65) Prior Publication Data
US 2007/0152621 A1 Jul. 5, 2007

(30) Foreign Application Priority Data
Dec. 29, 2005 (KR) ...................... 10-2005-0132809

(51) Int. Cl.
*G05B 19/25* (2006.01)
(52) U.S. Cl. .................. 318/571; 318/600; 408/13; 700/190
(58) Field of Classification Search ......... 318/569–572, 318/600, 626; 408/5–13; 700/186–191
See application file for complete search history.

(56) References Cited
U.S. PATENT DOCUMENTS 3,699,317 A * 10/1972 Middleditch ................ 700/187
3,705,339 A * 12/1972 Rhoades et al. ............. 318/571
3,825,735 A * 7/1974 Bowers et al. .............. 318/573
4,723,219 A * 2/1988 Beyer et al. ................. 700/190

* cited by examiner

*Primary Examiner*—Bentsu Ro
(74) *Attorney, Agent, or Firm*—Allen, Dyer, Doppelt, Milbrath & Gilchrist, P.A.

(57) ABSTRACT

Disclosed herein is a turret servo control device with an overriding function and control method thereof. The turret servo control device comprises: a feed information-generating means for generating at least one of feed information of a turret as a control command to output the generated control command, the feed information including sequence, position and speed of the turret; a PLC means 130 connected to the feed information generating means for receiving the control command from the feed information generating means by means of a predetermined contact point or protocol; a turret servo driver means 140 connected to the PLC means 130 for receiving the control command from the turret servo driver means by means of the predetermined contact point or protocol and converting the received control command into position and speed data of the turret; and a turret servo motor 150 connected to the turret servo driver means 140 and adapted to be controlled by the turret servo driver means 140, wherein the feed information generating means enables outputting of a new overriding change control command even during the outputting of the control command based on a preset change command.

15 Claims, 7 Drawing Sheets

TURRET SERVO CONTROL DEVICE WITH OVERRIDING AND CONTROL METHOD THEREOF

CROSS-REFERENCE TO RELATED APPLICATIONS

This application claims the benefit under 35 U.S.C. §119 (a) of Korean Patent Application No. 10-2005-132809, filed in the Korean Intellectual Property Office on Dec. 29, 2005, the entire disclosure of which is incorporated herein by reference.

FIELD OF THE INVENTION

The present invention relates to a turret servo control device, and more particularly to a turret servo control device with an overriding function and control method thereof, which can control the feeding speed of a turret so as to facilitate checking of the interference between a base metal and a processing tool prior to the processing of the base metal after mounting the tool to the turret.

BACKGROUND OF THE INVENTION

In general, among machine tools for processing a workpiece, a numerical control (NC) lathe includes a spindle unit of which shaft is operated in cooperation with a spindle motor and in which a chuck for clamping a workpiece is fit onto the shaft, a tail stock unit positioned on the central line identical to that of a drive shaft of the spindle unit to support the circumferential center of the workpiece so as to prevent the radial deviation of the workpiece from the reference position, i.e., the central axis of the workpiece due to the centrifugal force caused by the high rotation of the workpiece, a ball screw unit mounted on a bed positioned at the upper portion of the spindle unit and adapted to move horizontally and vertically to translate rotational motion to linear motion, and a tool post mounted over a carrier of the ball screw unit and including a variety of processing tools which can approach the workpiece to perform the machining operations such as, for example, turning, milling and drilling on the workpiece.

Also, the tool post is classified into a turret type which is mounted radially externally from the turret to machine the workpiece in a partitioning rotation manner according to a desired machining pattern and a gang type in which tools are arranged linearly to perform a desired machining on the workpiece through a vertical ascending and descending movement.

A turret device used in the turret-type tool post is configured such that various kinds of cutting tools are radially mounted to the circumference of a rotational cutting tool post called "a turret". Whenever such a turret rotates by a predetermined angle, respective cutting tools sequentially perform a cutting machining on a to-be-cut workpiece. Accordingly, despite a machining part requiring multiple processes, if a plurality of cutting tools is sequentially mounted to the turret, the machining operation on the machining part can be accomplished by a one-time rotation of the turret.

Meanwhile, a machine tool equipped with the turret as constructed above is controlled by the following conventional control method.

FIG. 1 is a block diagram illustrating the inner construction of a turret servo control device according to the prior art.

As shown in FIG. 1, the turret servo control unit performs the overall operation of the machine tool equipped with the turret, and serves to control the operation of the turret-equipped machine tool according to a command preset by a numerical control program.

The conventional turret servo control device includes a control panel 10, an NC 20, a PLC 30, a servo driver 40 and a servo motor 50. When a control command is input to the turret servo control device through the control panel 10, the NC 20 transmits a command for rotating the turret to the PLC 30. Then, the PLC 30 generates an operating signal based on the contents programmed in the PLC 30 for application to the servo driver 40 which in turn controls electric power so as to effect a rotational operation of the servo motor 50.

Such a conventional turret servo control device for a machine tool allows the command or information from the PLC 30 to be input to the servo driver 40 to operate the turret without a speed change during the rotation of the turret.

However, the conventional turret servo control device entails a problem upon the checking of the interference between a base metal and a processing tool prior to the processing of the base metal after mounting the tool to the turret due to such a disadvantageous characteristic that the speed of the turret during its rotation cannot be altered. That is, when the rotation speed of the turret is as high as the exchange speed of the tool during the processing of the base metal, there is a risk that the tool mounted to the turret and the base metal may collide with each other at the time of checking the interference between the base metal and the tool. Thus, since it is impossible to check the interference between the base metal and the tool during the automatic rotation of the turret, an operator must make the turret held at an unclamped state and then directly turn it with his hand to check the interference between the base metal and the tool. Such manual operation causes danger and inconvenience to the operators in the process of treating tools.

In addition, a company which has purchased the NC must buys a set due to lack of compatibility of the PLC, which leads to an increase in the manufacturing cost.

That is, since the conventional turret servo control device is not equipped with a command processing means therein, the NC and the PLC including a command system associated with the servo driver must be purchased simultaneously.

SUMMARY OF THE INVENTION

Accordingly, the present invention has been made to solve the aforementioned problems occurring in the prior art, and it is a primary object of the present invention to provide a turret servo control device with an overriding function and control method thereof, which enables variation in the feeding speed of the turret by receiving new rotational speed information of the turret servo motor from a PLC even during the rotation of a turret, or enables variation in the feeding speed during the direct rotation of the turret by means of a feeding speed change command from a CNC program.

A second object of the present invention is to provide a turret servo control device with an overriding function and control method thereof, which enables checking of the interference between a base metal and a processing tool prior even during the automatic rotation of the turret, and improves convenience of a user through the use of an overriding switch for a feeding shaft disposed in a main control panel even without installing a separate turret speed overriding switch at the main control panel.

A third object of the present invention is to provide a turret servo control device with an overriding function and control method thereof, in which a turret servo driver is additionally mounted with a controller and has an NC function therein so as to control the feeding speed of a turret servo motor under the control of the controller of the turret servo driver.

To accomplish the above objects, according to one aspect of exemplary embodiments of the present invention, there is provided a turret servo control device with an overriding function, including: a feed information-generating means for generating at least one of feed information of a turret as a control command to output the generated control command, the feed information including sequence, position and speed of the turret; a PLC means connected to the feed information-generating means for receiving the control command from the feed information generating means by means of a predetermined contact point or protocol; a turret servo driver means connected to the PLC means for receiving the control command from the turret servo driver means by means of the predetermined contact point or protocol and converting the received control command into position and speed data of the turret; and a turret servo motor connected to the turret servo driver means and adapted to be controlled by the turret servo driver means, wherein the feed information generating means enables outputting of a new overriding change control command even during the outputting of the control command based on a preset change command.

Preferably, the turret servo driver means may further include a sequence-inputting/outputting means connected to the PLC means for allowing sequence information on the driving of the turret servo motor to be inputted thereto from the PLC means/outputted therefrom to the PLC means.

Also, the turret servo driver means may further include a position-inputting/outputting means connected to the PLC means for allowing position information on the driving of the turret servo motor to be inputted thereto from the PLC means 130/outputted therefrom to the PLC means.

In addition, preferably, the turret servo driver means may further include an overriding means connected to the PLC means for allowing rotation speed information on the driving of the turret servo motor to be inputted thereto from the PLC means/outputted therefrom to the PLC means.

Further, most preferably, the turret servo driver means may further include: a sequence-inputting/outputting means connected to the PLC means for allowing sequence information on the driving of the turret servo motor to be inputted thereto from the PLC means/outputted therefrom to the PLC means; a position-inputting/outputting means connected to the PLC means for allowing position information on the driving of the turret servo motor to be inputted thereto from the PLC means/outputted therefrom to the PLC means; an overriding means connected to the PLC means for allowing rotation speed information on the driving of the turret servo motor to be inputted thereto from the PLC means/outputted therefrom to the PLC means; and a controlling means for controlling the turret servo motor based on the sequence information applied thereto from the PLC means through the sequence-inputting/outputting means, the position information applied thereto from the PLC means through the position-inputting/outputting means and the rotation speed information applied thereto from the PLC means through the overriding means.

Also, preferably, the controlling means may include: a feed rate-converting means for converting a feed tool number inputted thereto from a machine tool or a tool number switch into a feed controllable value; a turret speed-inputting means for allowing the rotation speed of the turret to be inputted thereto based on the output data applied thereto from the feed rate-converting means or the rotation speed data applied thereto from the overriding means; and a turret position-controlling means for instructing the turret servo motor to rotate based on the output data of the turret speed-inputting means and a position feedback signal generated from the turret server motor.

In addition, preferably, the controlling means may further include: a turret speed-controlling means for instructing the turret servo motor to rotate based on a position conversion value of the turret position-controlling means and a speed feedback signal generated from the turret servo motor; and a turret current-controlling means for converting a pulse signal into a current value in response to an output signal of the turret speed-controlling means for application to the turret servo motor.

Besides, preferably, an output signal of the turret current-controlling means may be fedback to an input of the turret current-controlling means and be subtracted from the output signal of the turret speed-controlling means.

Preferably, the feed information-generating means may be a numerical control (NC) means for generating the feed information of the turret based on a predetermined program operation result.

Also, preferably, the feed information-generating means may include: a numerical control (NC) means for generating the feed information of the turret as the control command based on a predetermined program operation result; and a switch for instructing the turret to change its operation, wherein the numerical control (NC) means outputs of a new overriding change control command when the new overriding change control command is inputted to the switch during the outputting of the preset change control command.

Preferably, the feed information-generating means may include: a turret speed command switch for instructing the rotation speed of the turret; and a turret position command switch for instructing the position of the turret, and the feed information-generating means may be a main control panel switch for a machine tool.

To accomplish the above objects, according to one aspect of exemplary embodiments of the present invention, there is also provided a turret servo control method with an overriding function, including the steps of: an output step (S10) of allowing a feed information-generating means to generate at least one of overriding feed information of a turret as a control command to output the generated control command, the feed information including sequence, position and speed of the turret; a conversion step (S12) of allowing a PLC means to convert the overriding feed information into the control command; a control step (S14) of allowing a turret servo driver means to control a turret servo motor based on the converted control command; a feedback step (S16) of allowing a turret servo driver means to be fedback with rotational position and speed data from the turret servo motor so as to control the turret servo motor.

Further, preferably, the control step (S14) comprises the steps of: a step (S20) of generating a speed profile at rotational acceleration, constant speed and deceleration intervals of the turret servo motor; a step (S22) of controlling the rotational position, speed and current of the turret servo motor so as to allow the turret to be fed to an instructed tool number position; a step (S24) of determining whether or not there is a change in the rotational speed of the turret; a step (S26, S28) of, if it is determined that there is a change in the rotational speed of the turret through the machine tool or an external switch, regenerating a speed profile corresponding to the changed speed value and then performing a feed control of the turret using a new speed profile; and a step (S32) of, if the feed of the turret is completed, outputting a feed completion signal to the machine tool.

Preferably, the step (S32) may further include a step (S30) of determining whether or not the turret is moved to an instructed position.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Figure 1:
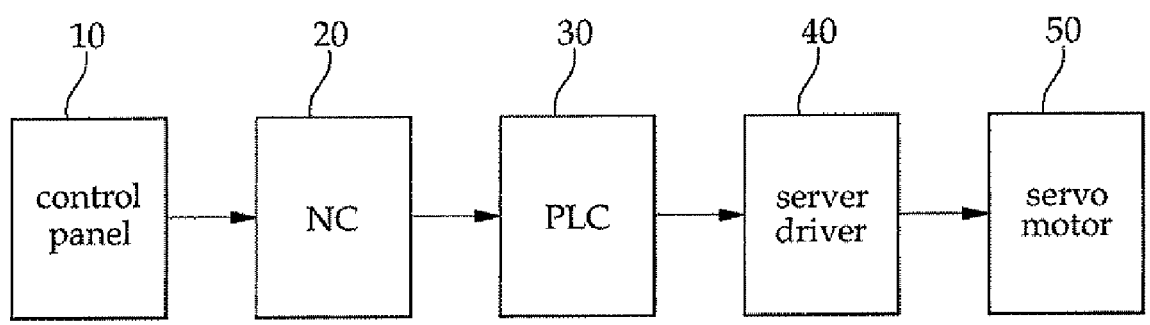
FIG. 1 is a block diagram illustrating the inner construction of a turret servo control device according to the prior art.

Reference will now be made in detail to a preferred embodiment of the present invention with reference to the attached drawings. Throughout the drawings, it is noted that the same reference numerals will be used to designate like or equivalent elements although these elements are illustrated in different figures. In the following description, the detailed description on known function and constructions unnecessarily obscuring the subject matter of the present invention will be avoided hereinafter.

Embodiment 1

Figure 2:
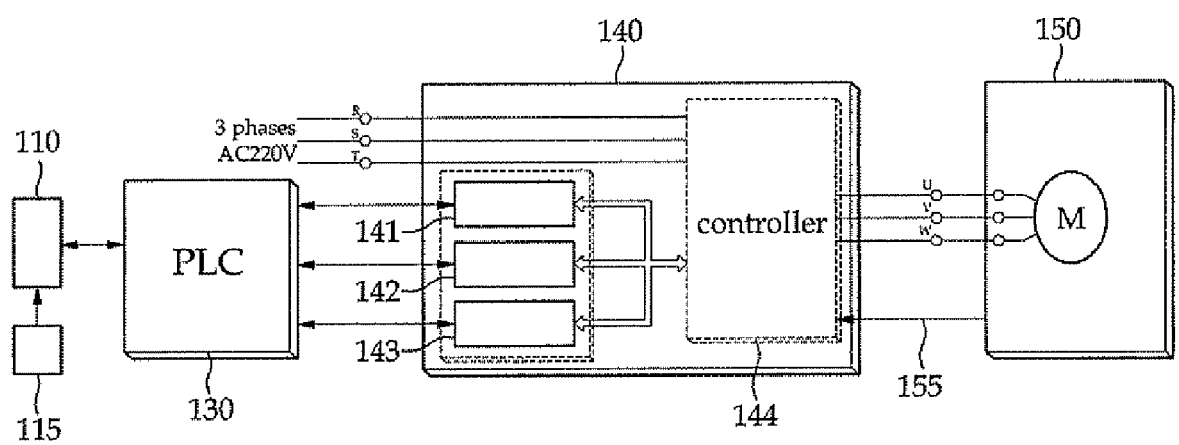
FIG. 2 is a block diagram illustrating the inner construction of a turret servo control device with an overriding function according to a first embodiment of the present invention.

FIG. 2 is a block diagram illustrating the inner construction of a turret servo control device with an overriding function according to a first embodiment of the present invention.

As shown in FIG. 2, the inventive turret servo control device for a machine tool mounted with a turret includes a numerical control (NC) section 110, a switch 115 mounted on the numerical control (NC) section 110, a PLC 130, a turret servo driver 140 and a turret servo motor 150. Particularly, the turret servo driver 140 a sequence-inputting/outputting section 141, a position-inputting/outputting section 142, an overriding section 143 and a controller 144, The PLC 130 performs communication with the numerical control (NC) section 110 by means of a predetermined protocol. The PLC 130 receives a control command from the numerical control (NC) section 110, and outputs a result corresponding to the control command to the numerical control (NC) section 110 and the turret servo driver 140.

The turret servo driver 140 is equipped with a controller 144. Since the controller 144 executes a detailed control command executed in a conventional numerical control (NC) section, it can perform a turret servo driving function if it programs only a protocol function along with other numerical control (NC) section. Thus, it is possible to separately mount only the turret servo driver 140, and so purchase costs of the device can be reduced.

The turret servo driver 140 receives a command and information associated with sequence, position and speed override from the PLC 130 though communication by a contact point or a predetermined protocol. The turret servo driver 140 directly controls the turret servo motor 150 so as to substantially control the turret mounted to the machine tool. Then, a result of such control is transferred to the PLC 130 through communication by the contact point or the predetermined protocol.

In addition, the turret servo driver 140 receives feedback information 155 from the turret servo motor 150. Also, the turret servo driver 140 includes a sequence-inputting/outputting section 141, a position-inputting/outputting section 142 and an overriding section 143 besides the controller 144. The sequence-inputting/outputting section 141 is connected to the PLC 130 and is adapted to allow sequence information on the driving of the turret servo motor 150 to be inputted thereto from the PLC 130 or outputted therefrom to the PLC means 130. The position-inputting/outputting section 142 is connected to the PLC 130 and is adapted to allow position information on the driving of the turret servo motor 150 to be inputted thereto from the PLC 130 or outputted therefrom to the PLC 130. The overriding section 143 is connected to the PLC 130 and is adapted to allow rotation speed information on the driving of the turret servo motor 150 to be inputted thereto from the PLC 130/outputted therefrom to the PLC 130.

Also, the controller 144 controls the turret servo motor 150 based on the sequence information applied thereto from the PLC 130 through the sequence-inputting/outputting section 141, the position information applied thereto from the PLC 130 through the position-inputting/outputting means 142 and the rotation speed information applied thereto from the PLC 130 through the overriding means 143.

The controller 144 controls the turret mounted to the machine tool. The controller 144 of the turret servo driver 140 also outputs the control result to the PLC 130 through the sequence-inputting/outputting section 141, the position-inputting/outputting section 142 and the overriding section 143 and outputs the control result transferred from the numerical control (NC) section 110 to representation section (not shown).

The controller 144 is fedback with position and rotation speed information 155 of the turret servo motor 150 from an encoder (not shown) of the turret servo motor 150. The feedback position and rotation speed information is compared with the position information applied to the controller 144 from the PLC 130 through the position-inputting/outputting means 142 and the rotation speed information applied to the controller 144 from the PLC 130 through the overriding means 143, respectively, so as to perform acceleration/deceleration of the turret servo motor 150. To this end, as shown in FIG. 5, the controller 144 includes a feed rate-converting section 144aa turret speed-inputting section 144ba turret position-controlling section 144c, a turret speed-controlling section 144d and a turret current-controlling section 144e.

Figure 5:
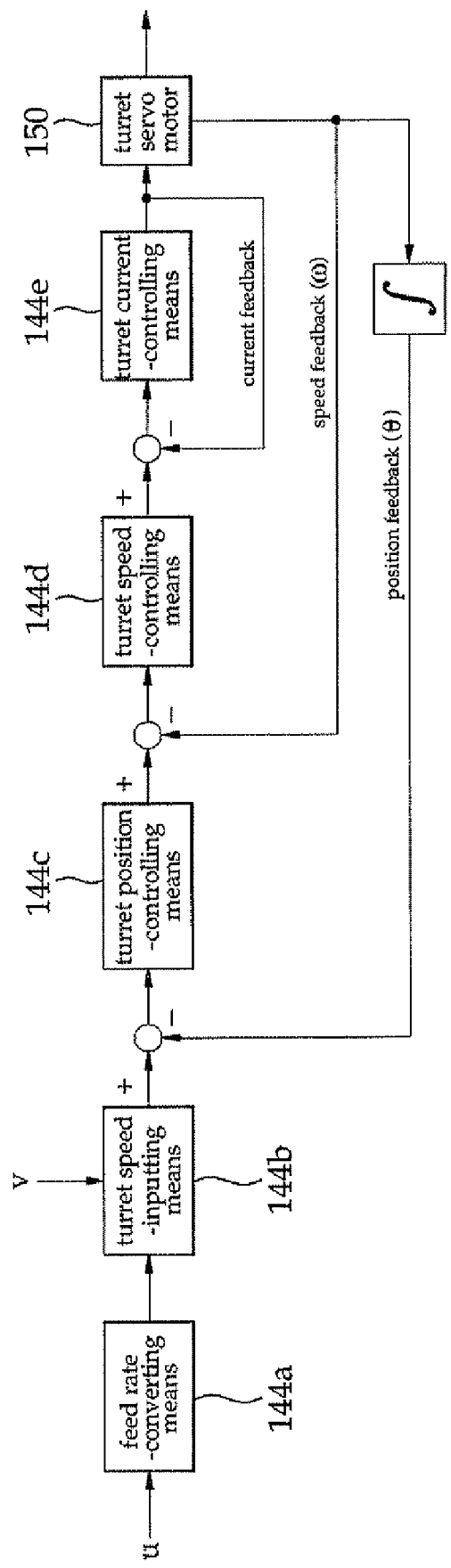
FIG. 5 is a block diagram illustrating the inner construction of a controller of the turret servo control device according to the present invention.

FIG. 5 is a block diagram illustrating the inner construction of a controller of the turret servo control device according to the present invention;

As shown in FIG. 5, the feed rate-converting section 144a, the turret speed-inputting section 144b, the turret position-controlling section 144c, the turret speed-controlling section 144d and the turret current-controlling section 144e are series connected with one another sequentially. First, when a feed tool number is inputted to the feed rate-converting means 144a from the NC or a tool number switch, the feed rate-converting means 144a converts the input feed tool number (u) into a feed controllable value. Then, the feed rate-converting means 144a converts the feed controllable value into a pre-programmed feed value so as to allow the turret servo motor 150 to rotate.

The turret speed-inputting means 144b allows the rotation speed of the turret to be inputted thereto based on the output data applied thereto from the feed rate-converting section 144a or the rotation speed data (v) applied thereto from an external manual speed converter such as the overriding section 143.

The turret position-controlling means 144c is applied with the output data of the turret speed-inputting section 144b and is fedback with position data obtained by integrating the speed data outputted from the encoder of the turret server motor 150. Thereafter, the turret position-controlling means 144c instructs the turret servo motor 150 to rotate after comparison between the output data and the feedback position data.

The turret speed-controlling section 144d is applied with a position conversion value of the turret position-controlling section 144c and is fedback with the speed data outputted from the encoder of the turret servo motor 150. Thereafter, the turret speed-controlling section 144d instructs the turret servo motor 150 to rotate after comparison between the position conversion value and the feedback speed data.

The turret current-controlling means 144e converts a pulse signal into a current value in response to an output signal of the turret speed-controlling section 144d for application to the turret servo motor 150. Then, the output current of the turret current-controlling section 144e is fedback to an input side of the turret current-controlling section 144e so as to allow a desired current value to be applied to the turret servo motor 150.

Embodiment 2

Figure 3:
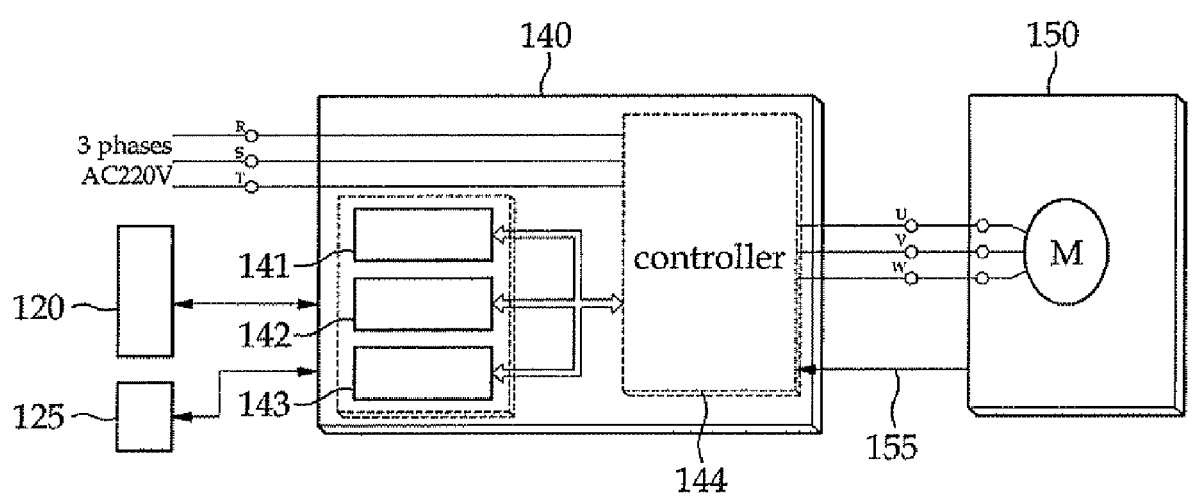
FIG. 3 is a block diagram illustrating the inner construction of a turret servo control device with an overriding function according to a second embodiment of the present invention.

FIG. 3 is a block diagram illustrating the inner construction of a turret servo control device with an overriding function according to a second embodiment of the present invention.

In FIG. 3, the detailed description of the same construction as that of FIG. 2 will be omitted. As shown in FIG. 3, a main control panel 120 is connected to the turret servo driver 140. Thus, a real-time control command is transferred to the turret servo driver 140 from a user through the main control panel 120.

That is, the control command of the main control panel 120 is directly transferred to the turret servo driver 140 without passing through the numerical control (NC) section 110 and the PLC 130 so as to instruct the turret servo motor 150 to rotate. This enables because detailed control command decryption programs are all stored in the controller 144 of the turret servo driver 140. For this reason, although the numerical control (NC) section 110 is omitted, the turret servo driver 140 executes the control command inputted thereto through the main control panel 120 to drive the turret servo motor 150.

Embodiment 3

Figure 4:
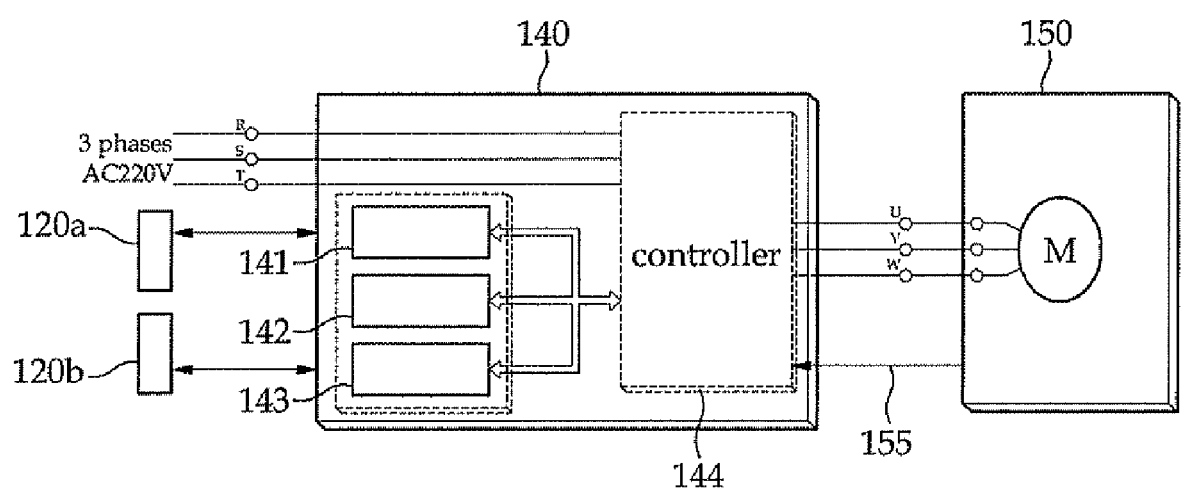
FIG. 4 is a block diagram illustrating the inner construction of a turret servo control device with an overriding function according to a third embodiment of the present invention.

FIG. 4 is a block diagram illustrating the inner construction of a turret servo control device with an overriding function according to a third embodiment of the present invention.

As shown in FIG. 4, a speed command switch 120a and a position command switch 120b are connected to the turret servo driver 140. Thus, a real-time control command is transferred to the turret servo driver 140 from a user through the speed command switch 120a and the position command switch 120b.

That is, the control command of the speed command switch 120a and the position command switch 120b is directly transferred to the turret servo driver 140 without passing through the numerical control (NC) section 110 and the PLC 130 so as to instruct the turret servo motor 150 to rotate. This enables because detailed control command decryption programs are all stored in the controller 144 of the turret servo driver 140.

<Operation>

Now, the operation of the present invention as constructed above will be described hereinafter with reference to FIGS. 6 and 7.

Figure 6:
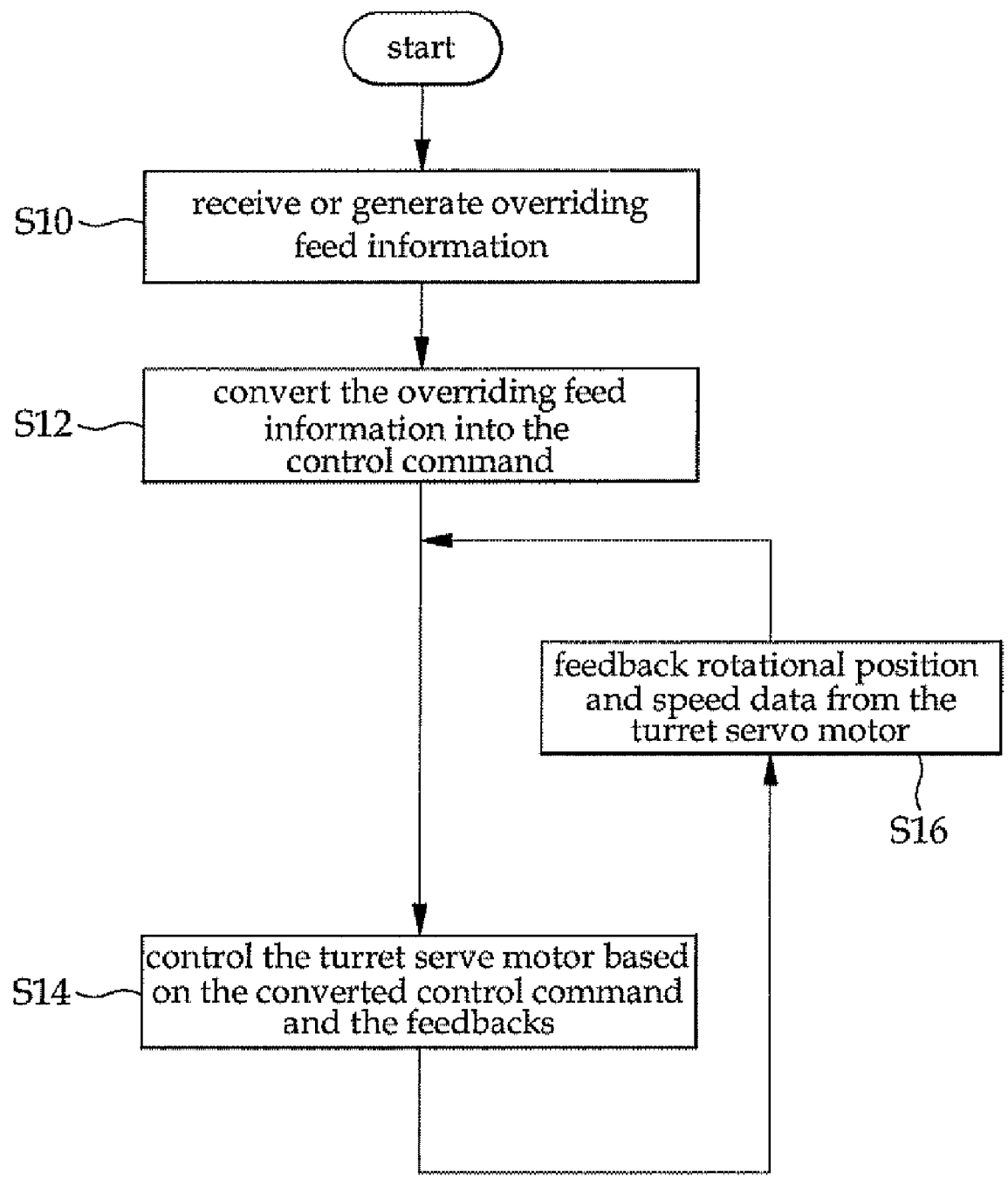
FIG. 6 is a schematic flow chart illustrating a turret servo control method according to the present invention.
Figure 7:
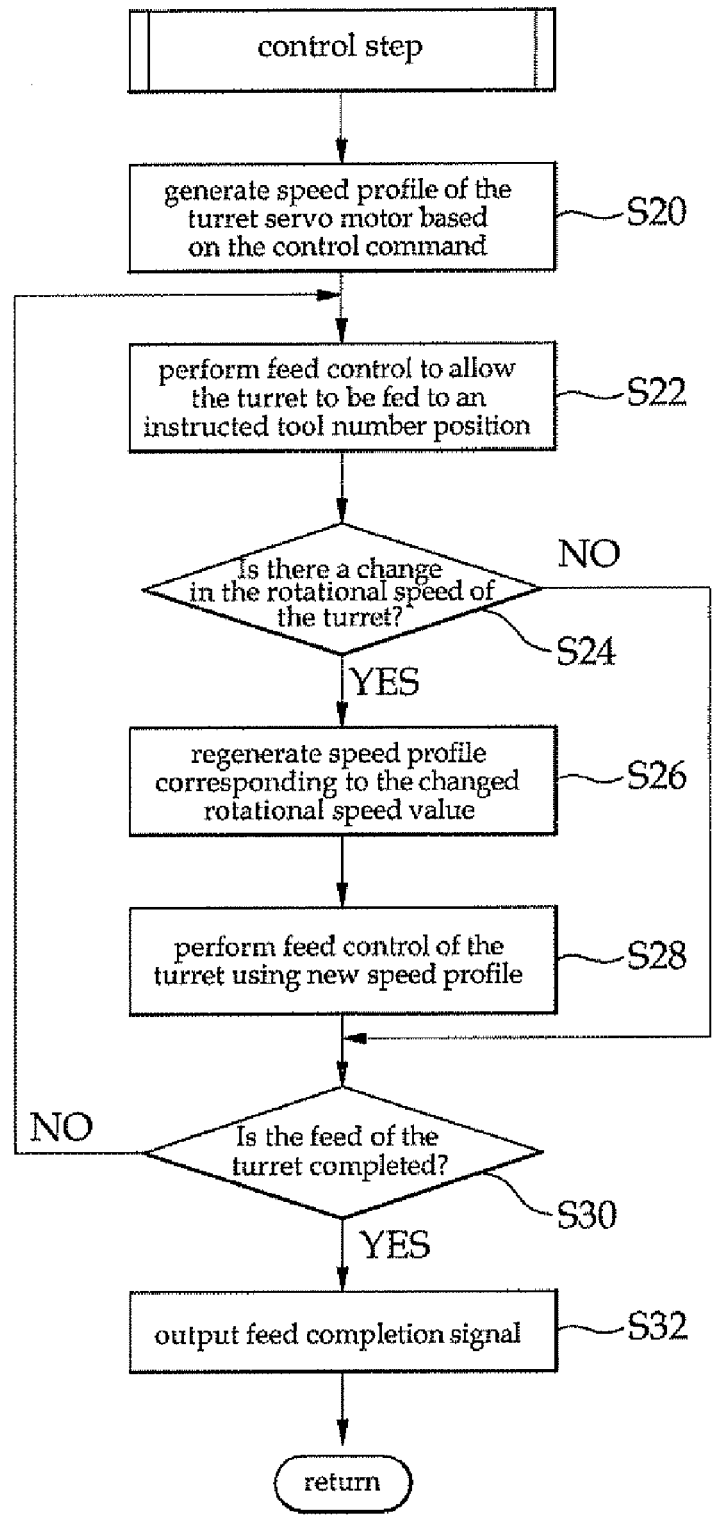
FIG. 7 is a detailed flow chart illustrating a control step (S14) in FIG. 6.

FIG. 6 is a schematic flow chart illustrating a turret servo control method according to the present invention, and FIG. 7 is a detailed flow chart illustrating a control step (S14) in FIG. 6.

Referring to FIG. 6, first, in the second embodiment of FIG. 2, at step S10, the numerical control (NC) section 110 generates overriding feed information including sequence, position and speed of the turret of a turret using a program installed therein. This overriding feed information may be generated based on an input value inputted from the outside through the numerical control (NC) section 110. Then, at step S12, the PLC 130 converts the overriding feed information into a control command.

In the second embodiment of FIG. 3, a real-time control command is transferred to the turret servo driver 140 from a user through the main control panel 120.

In the third embodiment of FIG. 4, a real-time control command is transferred to the turret servo driver 140 from a user through the speed command switch 120a and the position command switch 120b.

At subsequent step S14, the turret servo driver 140 controls the turret servo motor 150 based on the control command applied thereto from the PLC 130. In this case, the turret servo driver 140 continues to receive new rotational speed information from the PLC 130 through the overriding section 143 even during the rotation of the turret servo motor 150 so as to enable a speed change of the turret servo motor 150. This control operation allows the turret connected to the turret servo motor 150 to substantially rotate.

The control step S14 will be described in detail hereinafter with reference to FIG. 7.

At step S20, The controller 144 generates a speed profile at rotational acceleration, constant speed and deceleration intervals of the turret servo motor 150 based on the control command applied thereto from the PLC 130.

Then, the program proceeds to next step S22 where the controller 144 controls the rotational position, speed and current of the turret servo motor 150 so as to allow the turret to be fed to an instructed tool number position. At this time, the program proceeds to step S24 where the control 144 determines whether or not there is a change in the rotational speed of the turret. If it is determined at step S24 that there is not a change in the rotational speed of the turret, the program proceeds to step S30 where the controller 144 determines whether or not the feed of the turret is completed.

On the other hand, if it is determined at step S24 that there is a change in the rotational speed of the turret, the program sequentially proceeds to steps S26 and S28 where the controller 144 regenerates a speed profile corresponding to the changed speed value and then performs a feed control of the turret using a new speed profile when it receives a change value of the rotational speed of the turret from the machine tool or an external switch. That is, the turret servo driver 140 receives new rotational speed information, i.e., changed rotational speed information of the turret servo motor 150 from the PLC 130 through the overriding section 143 even during the rotation of the turret servo motor 150 and the controller 144 processes the changed rotational speed information of the turret servo motor 150 so as to reflect the processed result upon the control of the turret servo motor 150. Thus, a user can rotate the turret servo motor 150 at the changed rotational speed at a desired time point. In the meantime, if it is determined at step S30 that the feed of the turret is completed, the program proceeds to step S32 where the controller 144 outputs a feed completion signal to the machine tool, and then returns to step S16 where during the feed control of the turret servo motor 150, the turret servo driver means 140 is fedback with rotational position and speed data from the turret servo motor 150 so as to control the turret servo motor 150. This feedback process is intended to perform more precise control of the rotational position and speed of the turret servo motor 150.

The controller 144 processes the command or information subjected to the above control process to control the turret servo motor 150, and then outputs the control result to the PLC 130 through the sequence-inputting/outputting section 141, the position-inputting/outputting section 142 and the overriding section 143. The overriding operation according to the present invention is completed through the above control process. Since the rotational speed of the turret servo motor 150 can be controlled through the overriding section 143, the overriding section 143 can be manipulated manually. For this reason, when the tool rotates initially, the turret servo driver 140 controls the turret to rotate at a high speed. On the other hand, when the tool is positioned close to a workpiece, the turret servo driver 140 controls the turret to rotate at a low speed to check the interference between the workpiece and the tool.

As described above, the turret servo control device with an overriding function and control method thereof according to one embodiment of the present invention has the following advantageous effect. First, a speed change function, i.e., an overriding function is additionally provided to the turret servo driver to thereby facilitate checking of the interference between a base metal and a processing tool prior to the processing of the base metal after mounting the tool to the turret.

Also, it is possible to change a rotational speed of the turret during the rotation of the turret by receiving command and information associated with sequence, position and speed override from the PLC through communication by a contact point or a predetermined protocol. In addition, direct control of the rotational speed of the turret is possible through program of the numerical control (NC) section.

Furthermore, it is possible improve convenience of a user through the use of an overriding switch for a feeding shaft disposed in a main control panel irrespective of installation of a separate turret speed overriding switch at the main control panel.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A turret servo control device with an overriding function, comprising:

feed information-generating means for generating at least one of feed information of a turret as a control command to output the generated control command, the feed information including sequence, position and speed of the turret;

PLC means 130 connected to the feed information-generating means for receiving the control command from the feed information-generating means by means of a predetermined contact point or protocol;

turret servo driver means 140 connected to the PLC means 130 for receiving the control command from the turret servo driver means by means of the predetermined contact point or protocol and converting the received control command into position and speed data of the turret; and a turret servo motor 150 connected to the turret servo driver means 140 and adapted to be controlled by the turret servo driver means 140, wherein the feed information-generating means enables outputting of a new overriding change control command even during the outputting of the control command based on a preset change command.

2. The turret servo control device as set forth in claim 1, wherein the turret servo driver means 140 further comprises sequence-inputting/outputting means 141 connected to the PLC means 130 for allowing sequence information on the driving of the turret servo motor 150 to be inputted thereto from the PLC means 130/outputted therefrom to the PLC means 130.

3. The turret servo control device as set forth in claim 1, wherein the turret servo driver means 140 further comprises position-inputting/outputting means 142 connected to the PLC means 130 for allowing position information on the driving of the turret servo motor 150 to be inputted thereto from the PLC means 130/outputted therefrom to the PLC means 130.

4. The turret servo control device as set forth in claim 1, wherein the turret servo driver means 140 further comprises overriding means 143 connected to the PLC means 130 for allowing rotation speed information on the driving of the turret servo motor 150 to be inputted thereto from the PLC means 130/outputted therefrom to the PLC means 130.

5. The turret servo control device as set forth in claim 1, wherein the turret servo driver means 140 further comprises:

sequence-inputting/outputting means 141 connected to the PLC means 130 for allowing sequence information on the driving of the turret servo motor 150 to be inputted thereto from the PLC means 130/outputted therefrom to the PLC means 130;

position-inputting/outputting means 142 connected to the PLC means 130 for allowing position information on the driving of the turret servo motor 150 to be inputted thereto from the PLC means 130/outputted therefrom to the PLC means 130;

overriding means 143 connected to the PLC means 130 for allowing rotation speed information on the driving of the turret servo motor 150 to be inputted thereto from the PLC means 130/outputted therefrom to the PLC means 130; and controlling means 144 for controlling the turret servo motor 150 based on the sequence information applied thereto from the PLC means 130 through the sequence-inputting/outputting means 141, the position information applied thereto from the PLC means 130 through the position-inputting/outputting means 142 and the rotation speed information applied thereto from the PLC means 130 through the overriding means 143.

6. The turret servo control device as set forth in claim 5, wherein the controlling means 144 comprises:

feed rate-converting means 144a for converting a feed tool number inputted thereto from a machine tool or a tool number switch into a feed controllable value;

turret speed-inputting means 144b for allowing the rotation speed of the turret to be inputted thereto based on the output data applied thereto from the feed rate-converting means 144a or the rotation speed data applied thereto from the overriding means 143; and turret position-controlling means 144c for instructing the turret servo motor 150 to rotate based on the output data of the turret speed-inputting means 144b and a position feedback signal generated from the turret server motor 150.

7. The turret servo control device as set forth in claim 6, wherein the controlling means 144 further comprises:

turret speed-controlling means 144d for instructing the turret servo motor 150 to rotate based on a position conversion value of the turret position-controlling means 144c and a speed feedback signal generated from the turret servo motor 150; and turret current-controlling means 144e for converting a pulse signal into a current value in response to an output signal of the turret speed-controlling means 144d for application to the turret servo motor 150.

8. The turret servo control device as set forth in claim 7, wherein an output signal of the turret current-controlling means 144e is fedback to an input of the turret current-controlling means 144e and is subtracted from the output signal of the turret speed-controlling means 144d.

9. The turret servo control device as set forth in claim 1, wherein the feed information-generating means is a numerical control (NC) means 110 for generating the feed information of the turret based on a predetermined program operation result.

10. The turret servo control device as set forth in claim 1, wherein the feed information-generating means comprises:

a numerical control (NC) means 110 for generating the feed information of the turret as the control command based on a predetermined program operation result; and a switch 115 for instructing the turret to change its operation, wherein the numerical control (NC) means 110 outputs of a new overriding change control command when the new overriding change control command is inputted to the switch during the outputting of the preset change control command.

11. The turret servo control device as set forth in claim 1, wherein the feed information-generating means comprises:

a turret speed command switch 120a for instructing the rotation speed of the turret; and a turret position command switch 120b for instructing the position of the turret.

12. The turret servo control device as set forth in claim 1, wherein the feed information-generating means is a main control panel switch 120 for a machine tool.

13. A turret servo control method with an overriding function, comprising the steps of:

an output step (S10) of allowing feed information-generating means to generate at least one of overriding feed information of a turret as a control command to output the generated control command, the feed information including sequence, position and speed of the turret;

a conversion step (S12) of allowing PLC means 130 to convert the overriding feed information into the control command;

a control step (S14) of allowing turret servo driver means 140 to control a turret servo motor 150 based on the converted control command;

a feedback step (S16) of allowing the turret servo driver means 140 to be fedback with rotational position and speed data from the turret servo motor 150 so as to control the turret servo motor 150.

14. The turret servo control method as set forth in claim 13, wherein the control step (S14) comprises the steps of:

a step (S20) of generating a speed profile at rotational acceleration, constant speed and deceleration intervals of the turret servo motor 150 based on the control command;

a step (S22) of controlling the rotational position, speed and current of the turret servo motor 150 so as to allow the turret to be fed to an instructed tool number position;

a step (S24) of determining whether or not there is a change in the rotational speed of the turret;

a step (S26, S28) of, if it is determined that there is a change in the rotational speed of the turret through the machine tool or an external switch, regenerating a speed profile corresponding to the changed speed value and then performing a feed control of the turret using a new speed profile; and a step (S32) of, if the feed of the turret is completed, outputting a feed completion signal to the machine tool.

15. The turret servo control method as set forth in claim 13, wherein the step (S32) further comprises a step (S30) of confirming whether or not the turret is moved to an instructed position.

* * * * *